United States Patent
Dupaquis et al.

(10) Patent No.: US 7,848,515 B2
(45) Date of Patent: Dec. 7, 2010

(54) ENCRYPTION PROTECTION METHOD

(75) Inventors: Vincent Dupaquis, Biver (FR); Michel Douguet, Marseilles (FR)

(73) Assignee: Atmel Rousset S.A.S., Rousset Cedex (FR)

( * ) Notice: Subject to any disclaimer, the term of this patent is extended or adjusted under 35 U.S.C. 154(b) by 1264 days.

(21) Appl. No.: 11/358,979

(22) Filed: Feb. 22, 2006

(65) Prior Publication Data

US 2008/0019503 A1    Jan. 24, 2008

(30) Foreign Application Priority Data

Nov. 21, 2005  (FR) .................................. 05 11768

(51) Int. Cl.
  *H04L 9/28*  (2006.01)
(52) U.S. Cl. ............................ 380/28; 380/29; 380/255
(58) Field of Classification Search .................. 380/28, 380/263, 252; 714/781; 713/194
  See application file for complete search history.

(56) References Cited

U.S. PATENT DOCUMENTS

| 6,028,939 | A | 2/2000 | Yin |
| 6,278,783 | B1 * | 8/2001 | Kocher et al. .............. 380/277 |
| 6,724,894 | B1 | 4/2004 | Singer |
| 6,738,478 | B1 | 5/2004 | Vanstone et al. |
| 6,754,190 | B2 | 6/2004 | Gurney et al. |
| 7,043,017 | B2 * | 5/2006 | Swindlehurst et al. ......... 380/29 |
| 2003/0044003 | A1 | 3/2003 | Chari et al. |
| 2003/0093684 | A1 | 5/2003 | Kaiserswerth et al. |
| 2004/0139340 | A1 | 7/2004 | Johnson et al. |
| 2005/0076228 | A1 | 4/2005 | Davis et al. |
| 2005/0169463 | A1 * | 8/2005 | Ahn et al. ..................... 380/28 |
| 2005/0283714 | A1 * | 12/2005 | Korkishko et al. .......... 714/781 |

FOREIGN PATENT DOCUMENTS

| EP | 1 587 237 A1 | 10/2005 |
| FR | 2 832 739 A1 | 5/2003 |
| WO | WO-2007102898 A2 | 9/2007 |
| WO | WO-2007102898 A3 | 9/2007 |

OTHER PUBLICATIONS

"International Application No. PCT/US2006/061165 Search Report", (Oct. 25, 2007), 2 pgs.
"International Application No. PCT/US2006/061165 Written Opinion", (Oct. 25, 2007), 5 pgs.

(Continued)

*Primary Examiner*—Pramila Parthasarathy
(74) *Attorney, Agent, or Firm*—Schwegman, Lundberg & Woessner, P.A.

(57) ABSTRACT

A deterministic blinding method for cipher algorithms that employ key-mixing and substitution (S-box) operations uses a masking table constructed with a true mask and a plurality of dummy masks corresponding to every possible S-box input. Each mask is applied in the key-mixing operation (e.g., bitwise XOR) to the cipher key or to round subkeys to generate true and dummy keys or subkeys that are applied to the data blocks within the overall cipher algorithm or within individual cipher rounds. The mask values prevent side-channel statistical analyses from determining the true from the dummy keys or subkeys. The true mask is identifiable to the cipher but not by external observers.

3 Claims, 3 Drawing Sheets

OTHER PUBLICATIONS

Wu, L., et al., "CryptoManiac: A Fast Flexible Architecture for Secure Communication", *In 28th Annual International Symposium on Computer Architecture (ISCA'01)*, Retrived from the Internet: <URL:http://hpc.serc.iisc.ernet.in/-govind/TiCA-04/ISCA01-WuEtAl.pdf>,(2001),110-119.

Federal Information Processing Standards Publication, "Data Encryption Standard (DES)", FIPS Pub 46-3, U.S. Dept. of Commerce, Oct. 25, 1999, 24 Pages.

Nist, "Recommendation for the Triple Data Encryption Algorithm (TDEA) Block Cipher", Spec. Pub. 800-67, Version 1, May 2004, 39 Pages.

J. Kilian, P. Rogaway, "How to Protect DES Against Exhaustive Key Search", Proceedings of Crypto 96, (DESX), Jul. 28, 1997, 19 Pages.

D. Page, F. Vercauteren, "Fault and Side-Channel Attacks on Pairing Based Cryptography", 19 Pages.

\* cited by examiner

ENCRYPTION PROTECTION METHOD

TECHNICAL FIELD

The present invention relates to methods of protecting a cryptographic hardware engine from targeted cryptoanalysis attacks during operation, and in particular relates to protecting an input value (on the key side) of encryption algorithm substitution (S-box) operations in any given round from side channel attacks through the use of masking methods (false or dummy operations).

BACKGROUND ART

In U.S. Patent Application Publication No. 2004/0139340, Johnson et al. discusses problems with making encryption algorithms secure against so-called "white-box attacks," such as statistical and data flow analyses, by attempts that include using dummy code to hide real code. Johnson et al. offers an alternative solution that includes widely diffusing sites of information transfer, combination, or loss, and generating more functions and transforms that alter the processing activity visible to an attacker. These solutions are applied in an exemplary implementation that is directed to securing smart cards that use the DES algorithm or a variant thereof.

In U.S. Patent Application Publication No. 2003/0044003, Chari et al. discloses a method and system for implementing table lookups that is resistant to side channel attacks. A table mask operation is used, in which the entries in the masked table are statistically independent of the entries in the original table. The table mask operation is performed with either or both of (1) a table split operation, for large tables or tables with large index sizes; or (2) a table aggregate operation, where a number of tables are aggregated into one table.

In U.S. Patent Application Publication No. 2003/0093684, Kaiserwerth et al. discusses potential vulnerabilities of encryption algorithms, especially to power analysis attacks. In this context they note that the small key size (effectively 56 bits) of single DES is no longer considered to be secure against key exhaustion attacks, necessitating the evolution to variants such as triple DES (run three times as encrypt-decrypt-encrypt using at least two and preferably three independent keys). Further, the S-boxes in DES are potentially vulnerable to differential analysis of S-box inputs and outputs so as to obtain 48 out of the 56 key bits. Kaiserwerth et al. discloses several measures to thwart this type of attack, including using masking operations and Hamming-neutral bit strings.

In U.S. Pat. No. 6,278,783, Kocher et al. discloses an improved DES implementation in which S-box tables are blinded and randomly permuted on a regular basis, and both the key and message blocks are blinded to produce permutable two-part values related to the original values by a bitwise XOR operation.

In general, side-channel attacks involve externally monitoring power consumption or electro-magnetic emissions of the cryptographic hardware during execution of a targeted cipher algorithm, and attempting to correlate the timing profile of the monitored characteristic with the target algorithm in order to obtain useable information regarding the key. For example, one such attack may directly target that portion of an algorithm's execution at the input side of an algorithm's S-boxes, where data are XORed with subkeys in a given round. One way to protect an encryption algorithm against side-channel attacks would be to use a randomized masking or blinding method, i.e., running numerous fake or dummy operations along with the true operation. However, a problem with such randomized masking is that the entropy injected in the execution of the added dummy operations is not controlled, so that it is still possible to uncover the true operation using statistical techniques.

SUMMARY DISCLOSURE

The present invention is a deterministic blinding method for encryption algorithms that are susceptible to targeted attacks, especially but not exclusively for those cipher algorithms employing substitution (S-box) operations or logically combining data with round subkeys, such as by bitwise XOR operations on the input side of cipher S-boxes. The deterministic blinding method of the present invention controls injected entropy when running a set of false or dummy operations in order to achieve much greater protection of the true operation than purely random blinding or masking techniques.

The method generally begins with building a masking table in advance, which contains one line corresponding to the true key and numerous protection lines that have been built to blind at least some bits of the key in various combinations. When lines from the table are logically combined with a given key, the method obtains a set of keys, only one of which is true, while all of the others are dummy keys. (For example, in the case of a bitwise XOR combining operation, the line in the table corresponding to a true key would be a mask containing all zero bits, while the protection lines would be masks where at least some bits are ones.) The cipher algorithm executes on a message block multiple times using the true and dummy keys in random order to generate corresponding true and dummy round subkeys. The result obtained from applying the true key to the cipher operation is stored in memory, while the incorrect results from the dummy keys are stored in a dummy memory location. After the cipher has executed for each of the keys, the true result is accessed from the memory.

Alternatively, the lines of the masking table could be logically combined with the subkeys within the cipher rounds to obtain a true subkey and a set of dummy subkeys for each of the rounds. These subkeys are then applied to process the message block according to the cipher round with only the true result being passed along to the next round.

For those cipher algorithms employing S-box operations, some number n of bits will enter the input side of an S-box (commonly implemented as a look-up table). There are thus $2^n$ possible input values for the S-box. In an exemplary embodiment of the present invention, a masking table containing $2^n$ masks is constructed, one of the masks containing all zeros (corresponding to the true operation) and all of the other masks containing some bits that are ones (corresponding to dummy operations). These masks are bitwise XORed with (a) a key to obtain a set of keys (one true and the remainder dummy keys) from which corresponding true and dummy round subkeys are generated, or (b) each round subkey to obtain a set of subkeys for each of the rounds (again, one true subkey for the round, and the others being dummy subkeys for the round). Within the cipher rounds, each of the subkeys is then logically combined with data in groups of n bits to enter the S-boxes. The dummy masks in the table may be specially chosen such that the groups of combined bits entering an S-box will take all $2^n$ possible input values, thereby completely leveling the entropy seen by an attacker so that the true round subkey used in that S-box operation cannot be ascertained externally.

DETAILED DESCRIPTION

Figure 1:
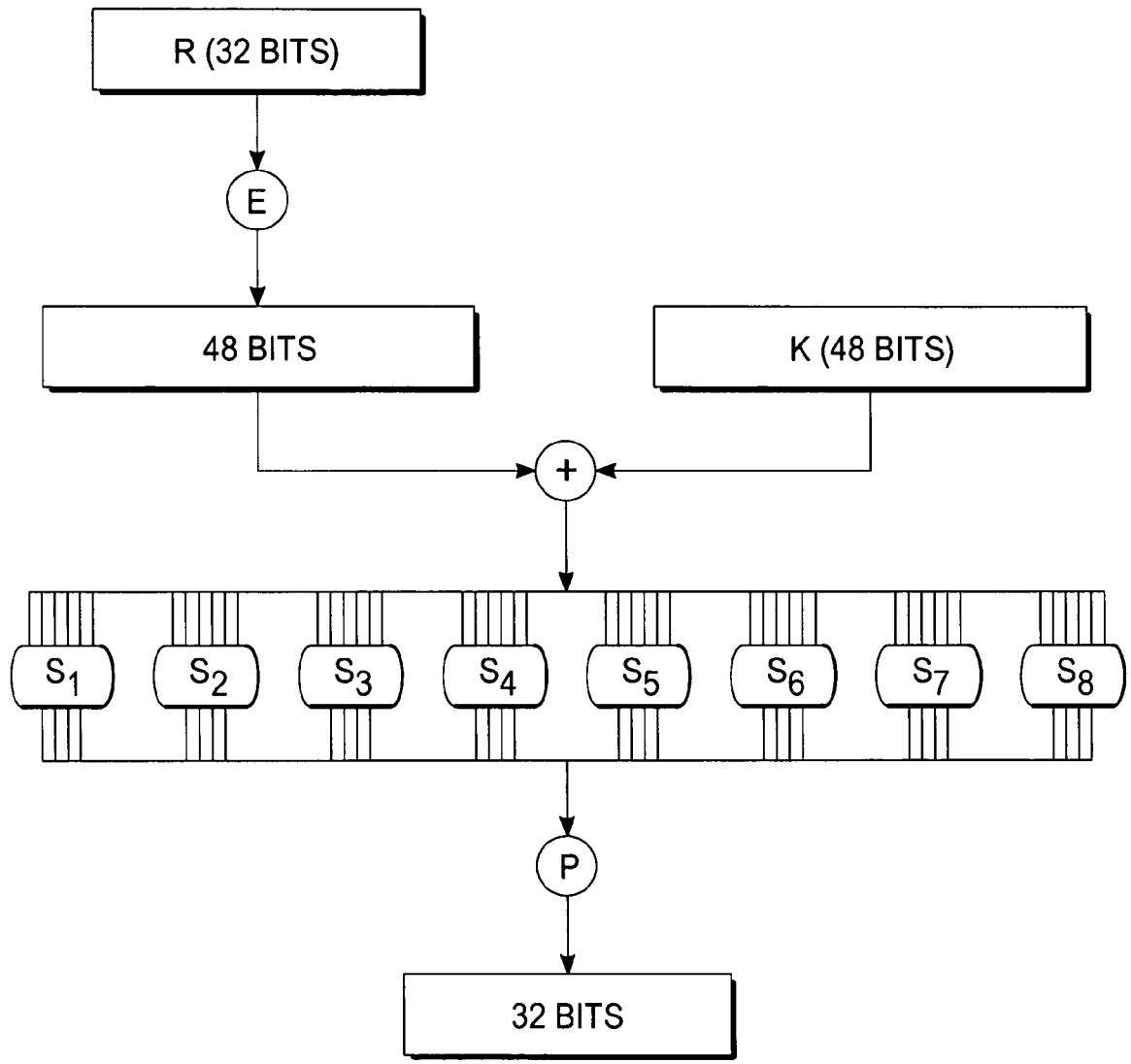
FIG. 1 is a schematic block diagram illustrating the DES cipher function in accord with the prior art DES standard.

Deterministic blinding may be applied in accord with the present invention as either a "global" masking method or an "inside" masking method. The basic idea is to apply each of the lines of a masking table to a key or round subkeys to obtain true and dummy keys or subkeys. In the global masking method, masking with the lines of the masking table is applied to the overall cipher key outside of the execution of the rounds of the cipher algorithm. This allows us to keep the existing hardware or software implementation of the cipher algorithm itself without any internal modification. Global masking generates a true cipher key and a set of dummy cipher keys. These cipher keys are then applied successively in some random order to a message block in multiple loops of the cipher algorithm. Hence, an implementation of the global masking method may process a loop of 64 operations of the cipher algorithm. Within each loop one can use table random access to pick at random an index i that has not already been used, so as to get a Mask[i] from the masking table. A bitwise-XOR operation upon the cipher key with the first-order Mask [i] produces a masked key. This masked key is then processed with the message block in the cipher algorithm, which may include the generation of round subkeys from the masked key. If the index i is IndexMaskZero, then the masked key will be the true key and the result of applying this loop of the cipher algorithm to the message block will be the true result which is then stored in memory. If the index i is different from IndexMaskZero, the masked key will be a dummy key and the dummy results are stored in a dummy location in the memory. Once all of the loops have executed, the true result may be accessed from memory.

An alternative method is the "inside" masking method. This technique modifies the internals of the cipher algorithm to apply the maskings inside to the round subkeys. Within each of the cipher rounds, all of the masks in the masking table are successively applied in a random order to the round subkey to obtain one true round subkey and numerous dummy subkeys for the round. These masked subkeys are used to process multiple loops of a round of the cipher algorithm. In particular, an implementation of the inside masking method may process a loop of 64 operations for each cipher round, with an index i randomly selected from among index values not already used in the round in order to obtain Mask[i] from the masking table and apply it to the round subkey. After processing that loop of the round with the masked subkey, if the index is IndexMaskZero corresponds to the true subkey, then the correct result of the round will be stored in memory. If the index is different from IndexMaskZero, meaning that this loop of the round has been processed with a dummy subkey, then the incorrect result will be stored in a dummy location of the memory. The correct result will be used in the next round, whereas the dummy results may be overwritten.

The deterministic blinding method of the present invention may be applied to various encryption algorithms executed in hardware cryptographic engines that are susceptible to side-channel attacks, and especially any of the symmetric block ciphers employing key schedules, with key-mixing and S-box operations. For purposes of illustration, the following description will be made with reference to the Data Encryption Algorithm, that was originally the core of the Data Encryption Standard (DES) set forth in the U.S. National Bureau of Standards (now the National Institute of Standards and Technology), Federal Information Processing Standards (FIPS) Publication 46-3, of 15 Jan. 1977, reaffirmed 25 Oct. 1999 (now withdrawn), and which remains in widespread use in several variants. Most notably, a variant known as Triple DES (3DES) and also as the Triple Data Encryption Algorithm (TDEA) involves applying the Data Encryption Algorithm three times in succession with independent keys, as described in NIST Special Publication 800-67 (May 2004). A less computationally expensive alternative variant is DES-X, which, using a technique known as key whitening, increases the effective key size by XORing extra 64-bit key material both before and after the core DES rounds (i.e., DES-$X_{K,K1,K2}$ (M)=$DES_K$(K1⊕M)⊕K2). These and other DES variants are approaches to reducing the vulnerability of DES to exhaustive key search because of its small effective key size. Still further variants modify the S-box tables, key schedule, or other core functions, in an effort to better resist linear cryptoanalysis or other potential vulnerabilities against which DES was not specifically designed. DES and its variants are commonly used as encryption engines in smart cards, which, because of their easy accessibility, are particularly vulnerable to side-channel attacks. The deterministic blinding method of the present invention substantially reduces this vulnerability in smart cards and other cryptographic hardware.

DES operates upon 64-bit message blocks with 16 identical rounds between initial and final permutations of the blocks. Modes of operation are specified for applying DES to messages longer than a single block. DES uses a 64-bit key (KEY), of which 8 bits are used solely for parity checking, so the effective key length is 56 bits. A key schedule function KS uses the KEY to generate 16 subkeys K1 through K16, one for each round. For decryption, the subkeys are generated and applied in reverse order. The complete definition of the key schedule KS involves a pair of permuted choices PC-1 and PC-2 (typically implemented as tables) and a series of bit rotations of two 28-bit blocks of selected key bits, as set forth in FIPS PUB 46-3. However, the ultimate effect of these operations is that each subkey K1 through K16 can be considered as a separate function of the KEY, expressed as a list setting out a specific permuted choice of 48 bits obtained from the KEY. Each of 56 KEY bits is used in different locations in approximately 14 out of the 16 subkeys. As an example, the subkey K1 defined by the DES key schedule function KS is:

| 10 | 51 | 34 | 60 | 49 | 17 |
|----|----|----|----|----|----|
| 33 | 57 | 2  | 9  | 19 | 42 |
| 3  | 35 | 26 | 25 | 44 | 58 |
| 59 | 1  | 36 | 27 | 18 | 41 |
| 22 | 28 | 39 | 54 | 37 | 4  |
| 47 | 30 | 5  | 53 | 23 | 29 |
| 61 | 21 | 38 | 63 | 15 | 20 |
| 45 | 14 | 13 | 62 | 55 | 31 | where the numbers represent the selected bits from the KEY and the subkey is organized in 8 groups of 6 bits each.

The 16 DES rounds has a Feistel structure in which 64-bit message blocks are divided into two ("left" and "right") half-blocks and processed alternately in successive rounds in a criss-cross scheme ($L_i=R_{i-1}$ and $R_i=L_{i-1} \oplus f(R_{i-1},K_i)$ for rounds i=1 to 16). The decipher scheme is similar. As seen in FIG. 1, the cipher function f(R,K) for a DES round involves the combination of (1) an expansion function E taking the 32-bit half-block $R_{i-1}$ and yielding a 48-bit output; (2) a key-mixing function, which uses a bitwise XOR operation $\oplus$ to combine the 48-bit expanded output with the 48-bit subkey $K_i$ for that round; (3) a nonlinear substitution transformation taking the 48-bit key-mixed output, dividing it into eight 6-bit pieces and applying these pieces as inputs respectively addressing eight selection tables or S-boxes $S_1$ to $S_8$ so as to obtain a set of eight 4-bit outputs; and (4) a permutation function P rearranging the 32 output bits from the S-boxes.

Each DES S-box $S_1$ to $S_8$ is a function associating a 6-bit input to a 4-bit output, as described in FIPS PUB 46-3. Groups of 6 bits enter each S-box and select one of 64 4-bit entries. The method of the present invention ensures that all 64 possibilities from each S-box are accessed. To do this, a masking table containing 64 masks is constructed. Each mask in the table may be 8 bytes wide, of which 48 bits are used for the masking operation and the remaining 16 bits (e.g., two from each byte) may be: (a) eight parity bits (or other error checking bits) that can be calculated by applying the parity rule of the DES key, and (b) either additional bits that can be chosen at random or calculated by deducting them with the same mechanism as the 48 bits, but for S-boxes in one or more other rounds. The 48 bits used for masking form a set of eight 6-bit values ranging from 0 to 63. Each of the eight 6-bit values in the set corresponds to a different one of the eight S-boxes, $S_1$ to $S_8$. (Note: In order to conceal the identity of the true mask from the dummy masks, and also to conceal the dummy values being used, the mask bits that form the eight values need not be extracted from the mask in consecutive nor in ascending order. For example, one could make use of one of the key schedules, such as that for round one, to obtain the values from each mask. Hence, the bits 10, 51, 34, 60, 49, and 17 might be used to obtain the mask values corresponding to the S-box $S_1$.)

The simplest masking table is as follows, where the columns S1 through S8 present the decimal equivalents of the extracted 6-bit values assigned to S-box for each mask:

|  | S1 | S2 | S3 | S4 | S5 | S6 | S7 | S8 |
|---|---|---|---|---|---|---|---|---|
| Mask[0] | 0 | 0 | 0 | 0 | 0 | 0 | 0 | 0 |
| Mask[1] | 1 | 1 | 1 | 1 | 1 | 1 | 1 | 1 |
| ... |  |  |  |  |  |  |  |  |
| Mask[63] | 63 | 63 | 63 | 63 | 63 | 63 | 63 | 63 |

Here each line of the table contains 8 identical values. However, other masking tables can be constructed, provided that in any given column (corresponding to a particular S-box), all of the possible values from 0 to 63 appear once and only once. There may otherwise be a random order to the values in each column. Typically, one of the masks, such as Mask[0], contains all 0 values and is designated as the "true" mask.

During operation of the cipher using the global masking method, all of the masks from the reconstructed mask table are applied to the overall cipher key before launching the otherwise unmodified cipher algorithm. The cipher algorithm as a whole may therefore loop multiple times, employing a different masked key for each loop of the entire cipher. One of the masked keys is the true key, generating true round subkeys as part of the cipher algorithm, where as all other masked keys are dummy keys that generate dummy subkeys and obtain dummy results. The 0 values are assigned to a single mask, which permits us to get the true result when this mask is used.

Figure 2:
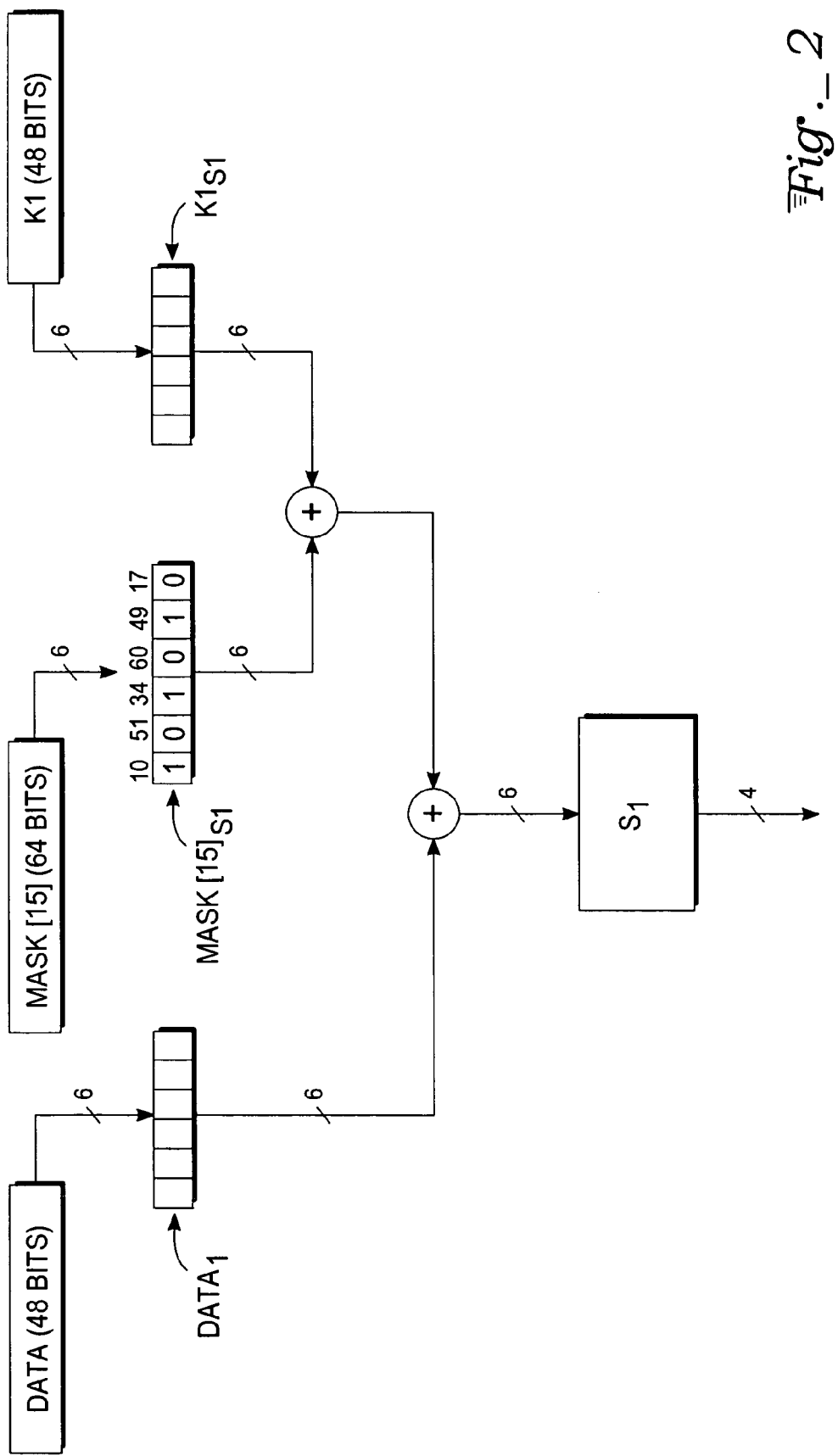
FIG. 2 is a schematic block diagram illustrating the DES cipher function as modified in accord with an exemplary embodiment of the present invention.

During operation of the cipher using the inside masking method, all of the masks from the pre-constructed mask table are applied in every round to the inputs of all S-boxes. FIG. 2 shows a illustrative example of applying a representative one of the 64 masks, such as Mask[15], to the first S-box $S_1$ during the first cipher round. This illustrates the modifications made to the inside of the cipher algorithm when implementing inside masking. The application of that mask to the other S-boxes $S_2$ to $S_8$ is similar, as is the application of the other masks, and also in subsequent rounds. In each round employing inside masking, the process loops 64 times in order to apply all of the masks, including the true mask, to the subkey and data. The masks may be applied in any order, e.g. in a randomized order, which may be different for each round, provided each mask is used exactly once in any round and provided the true mask is known to the encryption engine. That is, a random access of the mask table may be used. The identity of the true mask may be stored in a register to be compared with an index as the process loops through the set of masks. The true results output from the eight S-boxes are retained, e.g., in a register or memory, until all 64 masks have been applied, and then the true results are passed to the next step in the cipher algorithm. The DES permutation function P may be applied simultaneously with the storage of the true results from S-box outputs. If desired, false results may also be retained in a dummy memory location, and possibly permuted as well, but not necessarily passed along to the next round in the cipher.

The inputs to the eight S-boxes comprise (1) an expanded data block, DATA, obtained from the DES expansion function E; (2) the DES subkey for the particular round, here subkey K1; and (3) the particular mask being applied, here Mask[15]. As usual for DES, the bits from the expanded data block DATA are assigned consecutively to the eight S-boxes, with bits 1-6 for $S_1$, 7-12 for $S_2$, etc. The bits for the subkey K1 are likewise assigned consecutively to the eight S-boxes, with bits 1-6 of K1 for $S_1$, bits 7-12 of K1 for $S_2$, etc., except that it should be remembered that the subkey K1 itself, as with the other subkeys for the subsequent rounds, is a selection and rearrangement of bits from the main key KEY. Particular bits from Mask[15], as also with the other masks in the table, are selected and ordered so as to extract the values to be applied for each S-box, as already described above. Thus, for the first S-box $S_1$, the $10^{th}$, $51^{st}$, $34^{th}$, $60^{th}$, $49^{th}$, and $17^{th}$ bits may be extracted from Mask[15] to obtain the value, Mask[15]$_{S1}$, to be applied for $S_1$. This value is here illustrated as 101010 (or decimal 42).

Each of these groups of bits (mask, subkey, data) is combined with the others using a bitwise XOR operation, symbolized by $\oplus$ in FIG. 2. The mask is here shown as being applied first to the subkey, and then the resulting masked key is applied to the data. However, since the bitwise XOR operation is commutative and associative, it may actually be applied to these three groups (mask, subkey, and data) in any order and still obtain the same S-box input. Indeed, it will certainly be beneficial to vary the order of application for different S-boxes, masks, and rounds, so as to further obscure the operations to any outside observer.

As noted above, the masking process of the present invention may be applied to ciphers other than DES and its variants.

For example, Rijndael, adopted as the Advanced Encryption Standard (AES), and published in NIST FIPS PUB 197, uses an S-box with 8-bit inputs and outputs. A mask table of 256 (=$2^8$) different masks may be constructed, and applied as part of that cipher's AddRoundKey( ) transformation. Many other cipher algorithms make use of S-boxes or similar substitution tables, and provide key mixing operations on the input side of such S-boxes. Determinative masking, as described herein for DES, is applicable to such ciphers.

Figure 3:
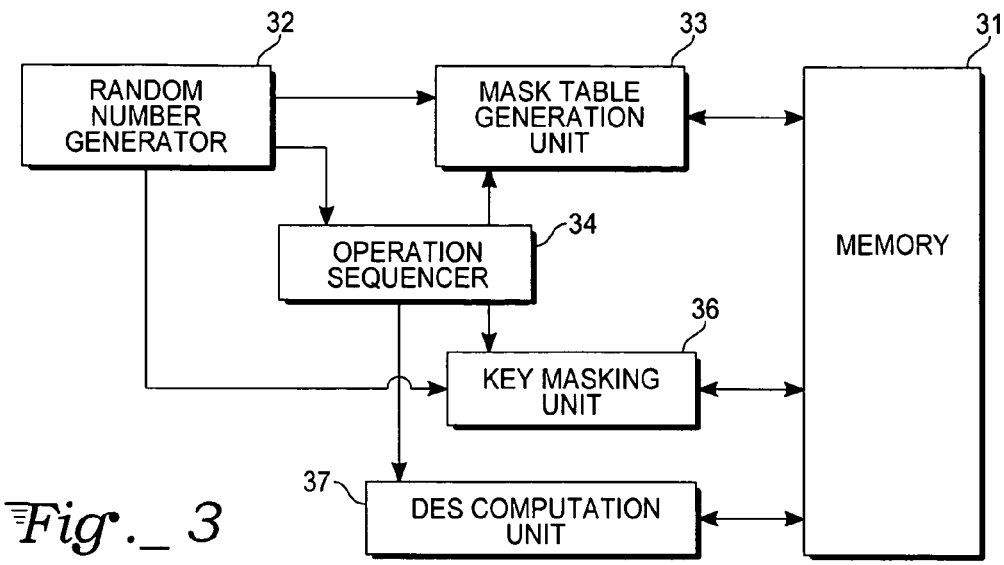
FIGS. 3 and 4 are hardware schematics in the form of block diagrams of exemplary encryption engines carrying out respective global masking and inside masking implementations of the method in accord with the present invention.

With reference to FIG. 3, exemplary hardware for executing the global masking implementation of the present invention is seen. The memory 31 is a read/write store for data, including masked keys. A random number generator 32 generates random numbers for use by the other units, including a random index i for accessing lines of the mask table. Any suitable generator known in the art may be used. A mask table generation unit 33 generates the entries of the mask table and writes them into memory 31. Operation sequencer 34 sends commands to the other units to sequence their actions. During each loop of the DES algorithm, a key masking unit 36 reads the ("true") cipher key from the memory 31, masks it with one entry from the mask table stored in memory 31, and write the masked key into the memory 31. The DES computation unit 37 reads the masked key and input data (the plaintext or ciphertext message block) from the memory 31, executes the DES cipher algorithm using the masked key, including generating any subkeys from the masked key, and writes the result as output data back into memory 31. The memory location used for storing the result will depend upon whether the masked key is the true key or a dummy key.

Figure 4:
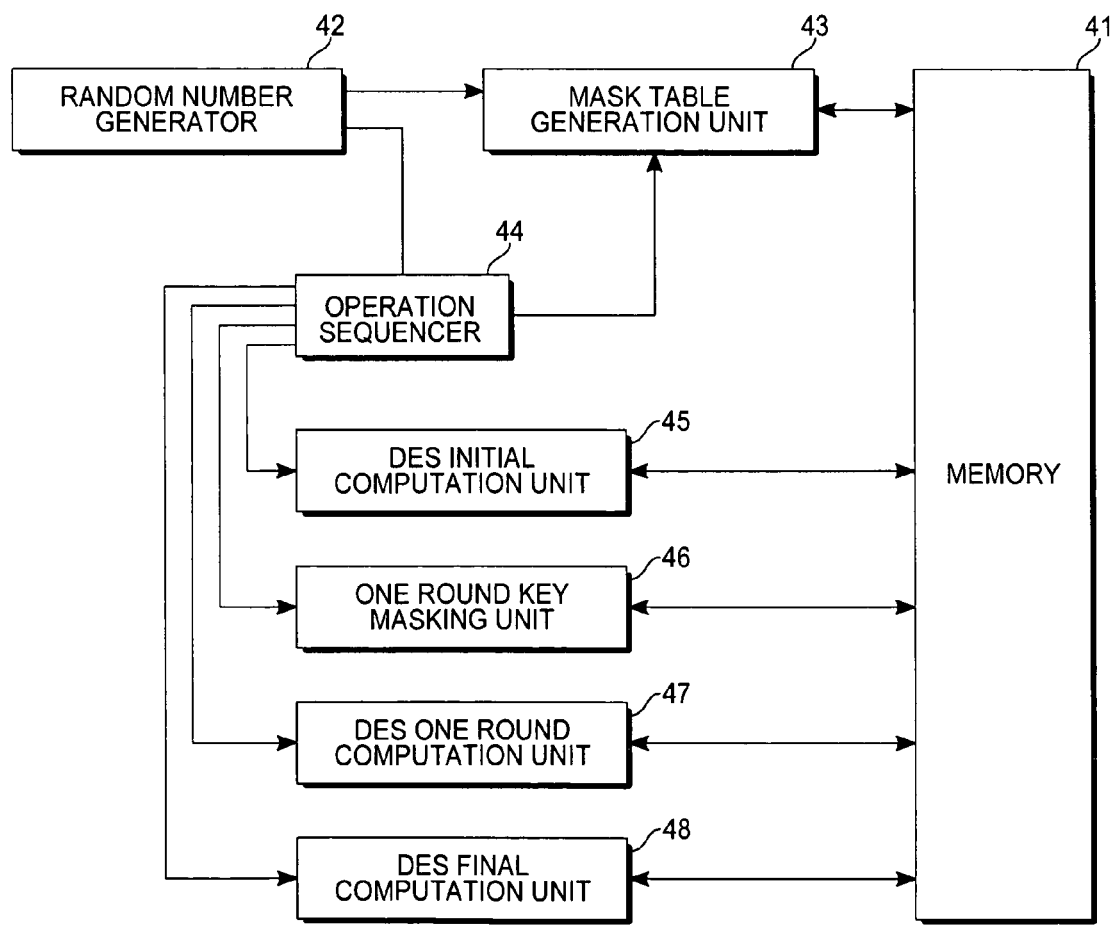

With reference to FIG. 4, exemplary hardware for executing the inside masking implementation of the present invention is seen. Like the global masking hardware implementation, this inside masking implementation also includes a memory 41, a random number generator 42 and a mask table generation unit 43, all of whose basic functions are substantially the same as the corresponding units 31-33 in the global masking hardware. An operation sequencer 44 likewise sends commands to the other units to sequence their actions, but the inside masking sequence differs from the global masking sequence. This hardware implementation further includes a DES initial computation unit 45, a round subkey masking unit 46, a DES round computation unit 47, and a DES final computation unit 48. The DES initial computation unit 45 performs DES pre-round computations. In particular, it reads input data (the plaintext or ciphertext message block to be processed) from memory 41, performs the initial processing step of DES before the first round (including any key whitening from DES-X or a similar variation), and writes the step result back into memory 41. Additionally, unit 45 reads the true cipher key from memory 41, generates a set of round subkeys in accord with the defined DES key generation routine and stores the round subkeys back into memory 41. Alternatively, generation of subkeys could be performed on a round-by-round basis by the DES round computation unit 47. In either case, round subkeys are masked by the round subkey masking unit 46, which reads the corresponding subkey from memory 41, masks it with one entry of the mask table from memory 41 in each loop of the round, and writes the masked subkey into memory 41. The DES round computation unit 47 reads the masked subkey for a given loop of the DES round and the input data for that round from memory 41, performs the round computations and writes the result back into memory 41. The memory location for storing the result of that loop of the round will depend upon whether the masked subkey is the true subkey for that round or a dummy subkey.

Each DES round loops multiple times until all maskings of the round subkey have been employed. The data result from applying the true subkey in the data input accessed from memory 41 in the next round. The DES final computation unit 48 reads the result of the final round from memory 41, performs DES post-round computations and writes the result (the fully processed message block) back into memory 41.

The processing units shown in these examples, with the exception of the masking units 36 and 46, are conventional components known for executing DES or other cipher algorithms. Memory 31 and 41 have locations allocated for storing the entry of the mask table, for storing both true and dummy keys or subkeys, and for storing both true and dummy data processing results. The masking units 36 and 46 perform bitwise-XOR or other logical combination or arithmetic operation upon keys or round subkeys using the mask table entries to generate the true and dummy keys or subkeys.

Variations from the above-described examples may be readily constructed and adapted for different cryptographic applications. For example, with a suitable fast processor, and care in designating true and dummy addresses for the round data results, the global end inside masking methods in accord with the present invention could both be used in combination with the true and dummy keys generated from the global technique treated as cipher keys for applying the inside masking to corresponding sets of round keys.

What is claimed is:

1. An encryption protection method, comprising:
constructing a masking table having a plurality of masks, including a true mask;
applying all masks of the masking table to a cipher key to generate masked keys, including one true key and a plurality of dummy keys, for use in multiple loops of a cipher algorithm;
executing the multiple loops of the cipher algorithm upon input message data to obtain processed message data results, each loop of the cipher algorithm being executed using a different one of the masked keys until all masked keys have been used once, the executing of a loop of the cipher algorithm using the true key producing a true message data result, while the executing of a loop of the cipher algorithm using any of the dummy keys producing a dummy message data result: and
storing the true message data result in a first memory location and storing the dummy message data results in one or more second memory locations,
wherein the execution of the loops using the dummy keys and the storage of the dummy message data results are to inhibit cryptoanalysis attacks by masking operations that use the true key, and
wherein in executing a loop of the cipher algorithm, a set of round subkeys is generated from the masked key used for that loop of the cipher algorithm, the true key generating a set of true round subkeys to be applied to the message data in rounds of one loop of the cipher algorithm to produce the true message data result, the plurality of dummy keys generating corresponding sets of dummy round subkeys to be applied to the message data in rounds of respective loops of the cipher algorithm to produce the dummy message data results.

2. An encryption protection method, comprising:
constructing a masking table having a plurality of masks, including a true mask;
applying, during each round of a cipher, all masks of the masking table to a subkey and a data block as part of a key-mixing operation for that round to mask said key-mixing operation, where applying the true mask to the subkey and data block obtains results identical to that of applying the subkey and data block alone in the key-mixing operation, and where applying all of the plurality of masks in the key-mixing operation obtain all possible S-box input values for the cipher;

applying the results of the masked key-mixing operation to inputs of a substitution table or S-box of the cipher; and proceeding with a next step of the cipher, using results of applying the true mask, until all rounds are completed, wherein the application of the masks in the key-mixing operation and the application of the results to inputs of the substitution table or S-box of the cipher are to inhibit cryptoanalysis attacks by masking operations that use the true mask, and wherein each mask in the masking table is accessed and applied in the key-mixing operation once and only once per round but in a random order, the true mask being identifiable to the cipher.

3. An encryption protection method for an encryption cipher, the method comprising:

constructing a masking table having $2^n$ masks, including a true mask, the true mask having a set of zero values, the $(2^n-1)$ other masks being dummy masks, each dummy mask having an ordered set of n-bit values assigned to different S-boxes of the cipher, the masks in the masking table having each of the $2^n$ possible n-bit values assigned once to each of the S-boxes;

applying, during each round of a cipher, all masks of the masking table to a subkey and data as part of a key-mixing operation for that round to mask said key-mixing operation, the subkey and data in any cipher round being subdivided into n-bit blocks assigned separately to the different S-boxes of the cipher, the key-mixing operation involving bitwise operations, wherein applying the zero values of the true mask to the subkey and data block obtains results identical to that of applying the subkey and data block alone in the key-mixing operation, and where applying all of the plurality of masks in the key-mixing operation obtain all possible n-bit S-box input values for each of the S-boxes of the cipher;

applying the results of the masked key-mixing operation to inputs of the S-boxes of the cipher; and proceeding with a next step of the cipher, using only the results of applying the true mask, until all rounds are completed, wherein the application of the masks in the key-mixing operation and the application of the results to inputs of the S-boxes of the cipher are to inhibit cryptoanalysis attacks by masking operations that use the true mask, and wherein each mask in the masking table is accessed and applied in the key-mixing operation once and only once per round but in a random order, the true mask being identifiable to the cipher.

* * * * *